United States Patent
Chen et al.

(10) Patent No.: US 9,529,408 B2
(45) Date of Patent: Dec. 27, 2016

(54) TOUCH SCREEN TERMINAL AND ALARM METHOD THEREOF

(71) Applicant: ZTE CORPORATION, Shenzhen (CN)

(72) Inventors: Fei Chen, Shenzhen (CN); Zhanmeng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/411,517

(22) PCT Filed: Jun. 21, 2013

(86) PCT No.: PCT/CN2013/077695
§ 371 (c)(1),
(2) Date: Dec. 28, 2014

(87) PCT Pub. No.: WO2014/000605
PCT Pub. Date: Jan. 3, 2014

(65) Prior Publication Data
US 2015/0160717 A1    Jun. 11, 2015

(30) Foreign Application Priority Data
Jun. 25, 2012    (CN) .......................... 2012 1 0209792

(51) Int. Cl.
*G08B 13/14*    (2006.01)
*G06F 1/32*    (2006.01)
(Continued)

(52) U.S. Cl.
CPC ............. *G06F 1/3262* (2013.01); *G06F 3/041* (2013.01); *G06F 3/0488* (2013.01); *G06F 21/31* (2013.01);
(Continued)

(58) Field of Classification Search
None
See application file for complete search history.

(56) References Cited

U.S. PATENT DOCUMENTS

| 7,218,226 B2 | 5/2007 | Wehrenberg |
| 2005/0190059 A1 | 9/2005 | Wehrenberg |

(Continued)

FOREIGN PATENT DOCUMENTS

| CN | 101059903 A | 10/2007 |
| CN | 201001137 Y | 1/2008 |
| CN | 201699791 U | 1/2011 |
| CN | 102750796 A | 10/2012 |

OTHER PUBLICATIONS

International Search Report for corresponding application PCT/CN2013/077695 filed Jun. 21, 2013; Mail date Sep. 26, 2013.

(Continued)

*Primary Examiner* — Kenneth B Lee, Jr.
(74) *Attorney, Agent, or Firm* — Cantor Colburn LLP

(57) ABSTRACT

A touch screen terminal and an alarm method thereof are provided. The method includes that: a terminal detects whether the touch screen receives a touch event; if so, the terminal sends an alarm. The solution solves the problem that due to the poor applicability of an anti-theft alarm method, alarm fails to really work, eventually the terminal is stolen. The solution provides a more reliable anti-theft method of high practicability, thereby enhancing system performance and improving user experience.

12 Claims, 6 Drawing Sheets

(51) Int. Cl.
*H04M 1/725* (2006.01)
*G06F 3/0488* (2013.01)
*G06F 3/041* (2006.01)
*G06F 21/31* (2013.01)
*G08B 13/24* (2006.01)
*G06F 21/88* (2013.01)
*H04W 12/00* (2009.01)
*H04M 1/66* (2006.01)
*G08B 25/00* (2006.01)
*H04W 88/02* (2009.01)

(52) U.S. Cl.
CPC ........... *G06F 21/88* (2013.01); *G08B 13/2491* (2013.01); *H04M 1/72519* (2013.01); *H04W 12/00* (2013.01); *G08B 13/149* (2013.01); *G08B 25/001* (2013.01); *H04M 1/66* (2013.01); *H04M 2250/22* (2013.01); *H04W 88/02* (2013.01)

(56) References Cited

U.S. PATENT DOCUMENTS

| | | |
|---|---|---|
| 2008/0316030 A1 | 12/2008 | Deng et al. |
| 2009/0251318 A1 | 10/2009 | Ho |
| 2010/0225607 A1* | 9/2010 | Kim .................. G06F 3/042 345/173 |
| 2010/0261505 A1 | 10/2010 | Yeh et al. |
| 2011/0039534 A1 | 2/2011 | Lee et al. |

OTHER PUBLICATIONS

Anonymous: "Wishlist/Anit-Theft Mode—Openmoko"; Mar. 10, 2010, URL:http://wiki.openmoko.org/wiki/Wishlist/Anti-Theft_Mode, XP55192167.

Supplementary European Search Report issued May 29, 2015 re: Application No. EP 13 80 9603; pp. 1-5; citing: Anonymous: "Wishlist/Anti-Theft Mode", US 2011/039534 A1, US 2010/261505 A1, US 2005/190059 A1 and US 2008/316030 A1.

* cited by examiner

TOUCH SCREEN TERMINAL AND ALARM METHOD THEREOF

TECHNICAL FIELD

The disclosure relates to the field of communications, and more particularly to a touch screen terminal and alarm method thereof.

BACKGROUND

With growing popularity of smart phone, tablet computer and other terminal products, they have become necessary tools of more and more people in daily life. But, if the terminal product is stolen, users will suffer economy loss, and the loss of personal information will cause inconvenience to the users. For preventing such terminal devices from being stolen, people have figured out many ways. However, all the anti-theft methods aim at mobile products.

The anti-theft measures used widely currently usually take effect after the terminal device was stolen, and the main aim of such measures is to remedy.

In related technologies, there is another method for sending alarm when the terminal device is being stolen. Due to the poor applicability of such method in related technologies, alarm fails to really work, eventually the terminal is stolen.

SUMMARY

The embodiments of the disclosure provide a touch screen terminal and alarm method thereof, so as to at least solve the problem in related technologies that due to the poor applicability of an anti-theft alarm method, alarm fails to really work, eventually the terminal is stolen.

According to an embodiment of the disclosure, an alarm method of a touch screen terminal is provided. The method includes that: the terminal detects whether a touch screen receives a touch event; if so, the terminal sends an alarm.

In the described embodiment, before the terminal detects whether the touch screen receives a touch event, the method further includes that: the terminal enters a sleep mode; and the terminal makes, in the sleep mode, the touch screen in a state of being able to receive the touch event.

In the described embodiment, the method further includes that: after the terminal starts an alarm mode, in the case that the terminal has not received an alarm cancelling password or a received alarm cancelling password is wrong, the alarm mode is still started when the terminal is powered on again, wherein the alarm is given in the alarm mode by executing the alarm method.

In the described embodiment, the terminal detecting whether the touch screen receives a touch event includes that: the terminal starts the alarm mode; and, after a pre-defined delay time, the terminal starts to detect whether the touch screen receives a touch event.

In the described embodiment, after the terminal sends an alarm, the method further includes that: it is determined whether the received alarm cancelling password matches with an alarm cancelling password preset in the terminal; if so, the alarm is stopped.

In the described embodiment, the alarm is given in at least one of the following manners: sound alarm, vibration alarm, display alarm, and sending alarm; wherein the sending alarm means making a call and/or sending a text message to a preset phone number.

According to another embodiment of the disclosure, a touch screen terminal is provided. The touch screen terminal includes: a detecting component, which is configured to detect whether the touch screen receives a touch event; and an alarming component, which is configured to send an alarm in the case of detecting that a touch event has been received.

In the described embodiment, the terminal further includes: a sleep component, which is configured to make the terminal enter a sleep mode; and a state enabling component, which is configured to make, in the sleep mode, the touch screen in a state of being able to receive the touch event.

In the described embodiment, the terminal further includes: an executing component, which is configured to, after the terminal starts an alarm mode, in the case that the terminal has not received an alarm cancelling password or a received alarm cancelling password is wrong, still start the alarm mode when starting the terminal again; wherein the alarm is given in the alarm mode by executing the alarm method.

In the described embodiment, the detecting component includes: a starting unit, which is configured for the terminal to start the alarm mode; and a detecting unit, which is configured for the terminal to start to detect whether the touch screen receives a touch event after a pre-defined delay time.

In the embodiments of the disclosure, whether to give an alarm is determined by detecting whether the touch screen receives a touch event; the touch screen is taken as a monitoring device to monitor the touch event in real time. The touch screen has a relatively large size and high sensitivity, so it is easier to monitor occurrence of anti-theft event by taking the touch screen as the monitoring device. The embodiments of the disclosure solve the problem that due to the poor applicability of an anti-theft alarm method, alarm fails to really work, eventually the terminal is stolen, and further provide a more reliable anti-theft method of high practicability, thereby enhancing system performance and improving user experience.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form improper limit to the disclosure. In the accompanying drawings.

DETAILED DESCRIPTION OF THE EMBODIMENTS

Figure 1:
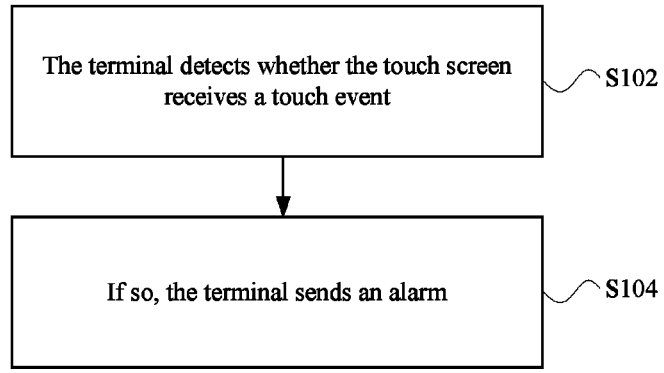
FIG. 1 is a flowchart of an alarm method of a touch screen terminal according to the embodiment of the disclosure.

The disclosure is described below with reference to the accompanying drawings and embodiments in detail. Note that, embodiments and features in embodiments in the application can be combined with each other on condition of not conflicting.

Before a terminal device is stolen, the anti-theft measures take effect when the terminal device is being stolen, which may warn the user timely and deter thief; such method aims to take preventive measures. However, the most advanced related terminal security technology is dissatisfactory, failing to play a role of anti-theft. The anti-theft method in related technologies is introduced below.

The first type of method: after the terminal device was stolen, some measures are adopted for preventing user information leakage, reducing loss and providing search information for the user.

Such type of method mainly uses the user information (SIM information, mobile phone number and password) and the carrier network to acquire some information after the mobile phone was stolen, and performs a related operation through anti-theft software in the mobile phone, so as to complete remedies, for example, requiring inputting an anti-theft password, sending notification to a preset phone number, locking the SIM card, stopping providing wireless communication service; there is another method that disables a people who is not the mobile phone holder to replace the SIM card by using a special device to lock the SIM card of the mobile phone. Such method has poor practicability, because once the mobile phone holder carelessly loses such a small unlocking device, the victim is the holder first.

To sum up, this type of method performs remedies after the terminal device has been stolen, for the user, because loss has been done, it is just a method adopted for preventing further loss, and can only play a role in remedy; although some methods provide, through some information after the device is lost, the basis for searching the device, because of being limited by various reasons, the implementability of getting the stolen mobile phone back in reality is very poor; judging from the current practical situation, this type of method does not really play a role of anti-theft, and fails to take actual effect.

The second type of method: when the terminal device is being stolen, an alarm signal is sent timely to warn the user, thereby avoiding being stolen. Several implementation ways of this type of method are introduced briefly.

A specially-made mobile phone cover or a strap connected with the mobile phone is adopted, wherein the cover or the strap includes a beeping circuit controlled by a switch. Once the mobile phone leaves the mobile phone cover or the strap abnormally, an alarm circuit sends alarm to warn the user. Such method requires the user to buy an additional product, and its main disadvantage is that the mobile phone must be placed in the specially-made mobile phone cover, and it is not easy to take the specially-made mobile phone cover away; however, in actual use, the mobile phone is usually placed in a bag carried by the user or a pocket, so the mobile phone cover can not work.

A detection alarm circuit is added in the mobile phone, and it cooperates with a receiving device through radio transmission or magnetic induction. Once there is a distance between the mobile phone and the receiving device, the mobile phone itself makes alarm beep to achieve the aim of alarming. Such method is possible in theory, but it requires adding a special transmission circuit and receiving device, so it is complicated to implement and the cost is high. Besides, the user needs to carry a receiving device additionally, which brings a great inconvenience to the user.

A corresponding detecting circuit, for example, an infrared sensor, is added in device; when a human body is close to the mobile phone, the electromagnetic infrared wave released from the human body is received by the infrared sensor, and then an alarm signal is generated. The main disadvantage of such method is that it is easy to generate false alarm because there are many infrared radiation sources which make the infrared detection anti-theft of the mobile phone easy to generate false alarm. Besides, a special metal wire mesh for generating induction current is covered on shell of the mobile phone; when an object touches the metal wire mesh, it generates induction current to send alarm. Such method is poor in practical operability, because adding the metal wire mesh on shell will have a great influence on the radio-frequency performance.

A special touch IC or an electrode slice set at side of the mobile phone is adopted to implement touch detection; such method has a limited effect; because an effective area of the electrode slice is limited, if a touch position is not in a work area of the electrode slice, alarm can not be triggered.

In general, such type of method warns the user timely when the device is being stolen, that is, such type of method takes preventive measures to protect the user against loss, thereby really playing a role of anti-theft. However, such type of method requires adding extra auxiliary products or specially adding induction detecting device and circuit, which adds extra cost and further increases cost. Furthermore, form the existing technical level, the actual effect of the method is very hard to get the ideal state, and the feasibility is very low. On the other hand, all the current anti-theft methods aim at mobile products; now with popularity of tablet computer products, tablet computers are at risk of being stolen, but there is no effective anti-theft method provided for tablet computers.

Based on the above alarm methods of poor implementability and weak anti-theft effect, the embodiments of the disclosure provide an alarm method of a touch screen terminal which is suitable for both mobile phone and tablet computer, and any terminal device with touch screen. The method makes use of existing hardware resource of device without need of adding any hardware circuit and device, so it achieves the aim of anti-theft of terminal products simply and effectively. Furthermore, the method warns before the terminal device is stolen, thereby preventing the device from being stolen and avoiding loss. The flow of the alarm method of a touch screen terminal according to the embodiment is shown in FIG. 1, including S102 to S104:

S102: the terminal detects whether the touch screen receives a touch event;

S104: if so, the terminal sends an alarm.

The embodiment of the disclosure adopts the following method: whether to give an alarm is determined by detecting whether the touch screen receives a touch event; the touch screen is taken as a monitoring device to monitor the touch event in real time. The touch screen has a relatively large size and high sensitivity, so it is easier to monitor occurrence of anti-theft event by taking the touch screen as the monitoring device. The embodiment of the disclosure solves the problem that due to the poor applicability of an anti-theft alarm method, alarm fails to really work, eventually the terminal is stolen, and further provides a more reliable anti-theft method of high practicability, thereby enhancing system performance and improving user experience.

In an implementation process, the terminal using the method is usually a mobile terminal, but the method is also applicable to the device with touch screen in factory. When the device uses the embodiment of the method, the aim of alarm is to prevent non-staff from operating workbench to cause loss. It is possible to have different settings for alarm mode according to different occasions, and in the described embodiment, a portable terminal is illustrated below.

In an implementation process of the detection alarm method, the terminal may always be in an operating state, but long-term enabling of this state will waste battery power and battery life of the terminal. Based on this, the embodiment may also enable the terminal to enter a sleep mode. When the terminal is in a sleep mode, the terminal makes the touch screen in a state of being able to receive the touch event; once the touch screen serving as a monitoring device is in the state of being able to receive external trigger event, the terminal can be monitored in real time, thereby realizing anti-theft while saving power.

Once the terminal starts the alarm mode, that is, starting to detect whether there is trigger event, if the user touches the touch screen, an alarm may also be generated. In view of this, delay time may be set before the terminal detects whether the touch screen receives a touch event, the delay time is provided for the user to place the terminal. After the predetermined delay time, the terminal starts to detect whether the touch screen receives a touch event. In this way, false alarm will not be generated when the alarm mode is just started, thereby avoiding unnecessary alarm cancelling operation and improving user experience.

When it is detected that there is a trigger event triggering the touch screen, the terminal sends alarm. There may be various manners of alarm, such as sound alarm, vibration alarm, display alarm, and sending alarm, wherein the sound alarm is making a warning sound by using a speaker, the vibration alarm is making the terminal generate vibration to warn the user that there is stealing occurring, the display alarm is displaying anti-theft or prompt icon and other icons on a display screen, and the sending alarm is making a call and/or sending a text message to a preset phone number. In specific implementation, the above alarm manners may be combined randomly, which makes the warning of alarm stronger to warn the user about the terminal.

After an alarm is sent, it is needed to input a corresponding alarm cancelling password to cancel the alarm. The terminal receives the alarm cancelling password from outside, and determines whether the received alarm cancelling password matches with an alarm cancelling password preset in the terminal; if so, stopping alarming; if not, continuing the alarm. The process ensures the security of alarm course.

In the case that the received alarm cancelling password does not match with the alarm cancelling password preset in the terminal and the alarm is continued, even the terminal is powered on again or powered off, it is impossible to make the terminal clear the memory of entering the alarm mode. Therefore, after the terminal starts the alarm mode, in the case that the terminal has not received an alarm cancelling password or a received alarm cancelling password is wrong, the alarm mode is still started when the terminal is powered on again, wherein the alarm is given in the alarm mode by executing the alarm method. The advantages of the memory process are obvious: even though the terminal is stolen, the thief is disabled to use the terminal.

The embodiment of the disclosure overcomes the shortcomings of the related art, and on the premise of not adding any hardware cost, implements a simple, effective and practical anti-theft method of terminal product based on hardware resource of the terminal device itself, which enhances performance of the mobile terminal while effectively avoiding theft event.

The above implementation mode is described below in combination with the accompanying drawings and example embodiments.

Example Embodiment 1

The present example embodiment provides a simple and practical anti-theft solution of touch screen terminal. When the user enables an anti-theft function, the touch screen serves as a detecting device of anti-theft monitoring. When someone holds the device with hand, the touch screen will be touched, and the touch screen detects touch and reports it to a main controller; then, the main controller starts an alarm device to warn the user.

Figure 2:
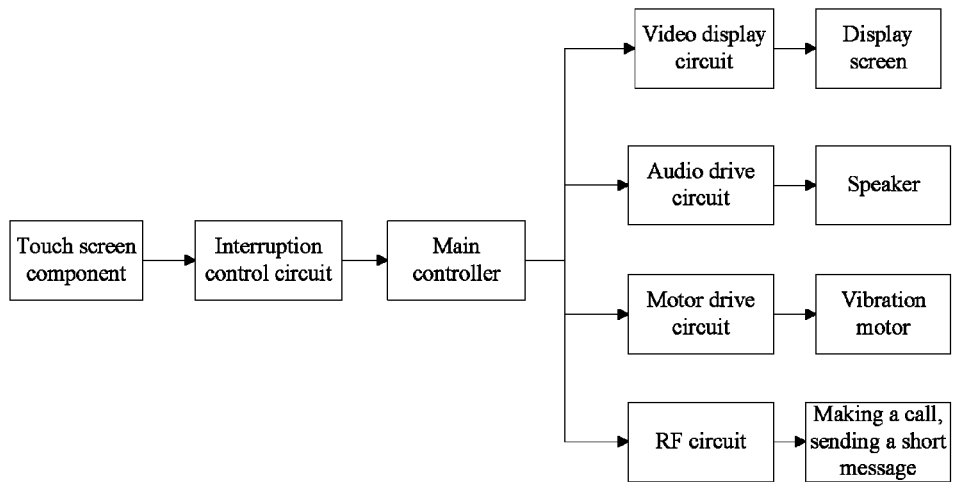
FIG. 2 is a system architecture diagram of a touch screen terminal according to the example embodiment 1 of the disclosure.

The present example embodiment does not change hardware of existing terminal, so there is no need to increase cost. In implementation, the terminal may be the existing terminal with touch screen, for example, the terminal with the architecture shown in FIG. 2; the terminal includes: a touch screen component which is configured to, after detecting touch, inform the main controller through an interruption control circuit; the main controller drives a video display circuit, an audio drive circuit, a motor drive circuit and a radio-frequency circuit simultaneously. The display drive circuit displays an alarm interface on a display screen; the audio drive circuit outputs a sound alarm signal to a speaker; the motor drive circuit drives a motor to send vibration alarm; a call is made and a text message is sent to a preset phone number through the radio-frequency circuit.

Figure 3:
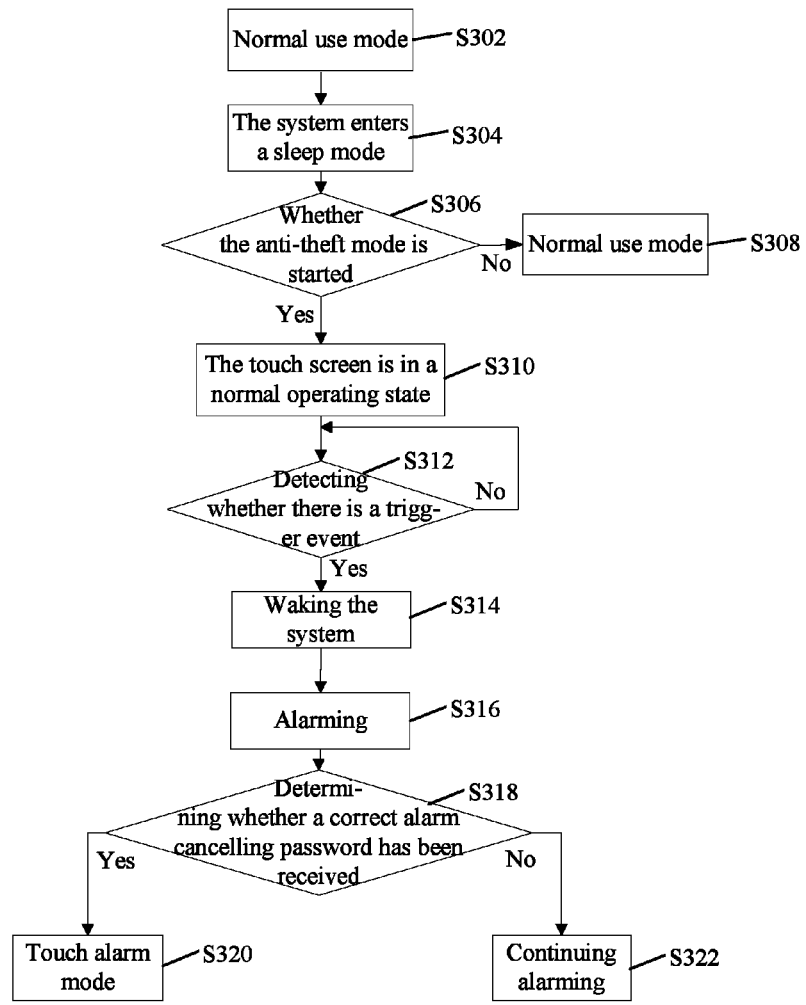
FIG. 3 is a work flowchart of an anti-theft method according to the example embodiment 1 of the disclosure.

FIG. 3 shows a work flow of an anti-theft method of the example embodiment; the flow includes S302 to S322.

S302: a device is in a normal use mode, it is just powered on or being used by the user.

S304: the user does not input in a certain time or the user performs some operations to make the device enter a sleep mode.

S306: it is detected whether the user starts the alarm mode; if so, S310 is executed; or else, S308 is executed.

S308: the touch screen is closed, so it can not receive the touch event.

S310: the touch screen is not closed in sleep mode, and it is always in a normal operating state.

When the step is executed, an LCD and other devices are powered off, and the system is in the sleep mode, so as to save power consumption. At this point, the system enters the alarm mode, and the touch screen serves as the anti-theft monitoring device.

S312: it is detected whether there is a trigger event; if so, S314 is detected; or else, S312 is detected.

When the step is executed, once the suspicious-looking wants to take up the device, or touch or take out the device from pocket of the user, the touch screen is touched inevitably by fingers.

S314: the main controller wakes the system, and the system exits the sleep mode and enters the normal operating state.

S316: the main controller controls an alarm subsystem to give an alarm. The alarm may be ringtone set by the user, vibration, making call, sending a text message and other ways.

S318: the terminal determines whether a correct alarm cancelling password has been received; if so, executing S320; or else, executing S322.

S320: the alarm mode is cancelled.

S322: the alarm is continued.

After receiving the alarm, the user determines according to situation whether the device was stolen or there is stealing occurring. If there is no stealing occurring, the alarm may be cancelled; or else, the stealing may be detected. The touch screen is used as the monitoring device, especially a capacitive touch screen, except the human body, the touch screen will not detect occurrence of touch, therefore, the false alarm will not be generated.

Example Embodiment 2

Figure 4:
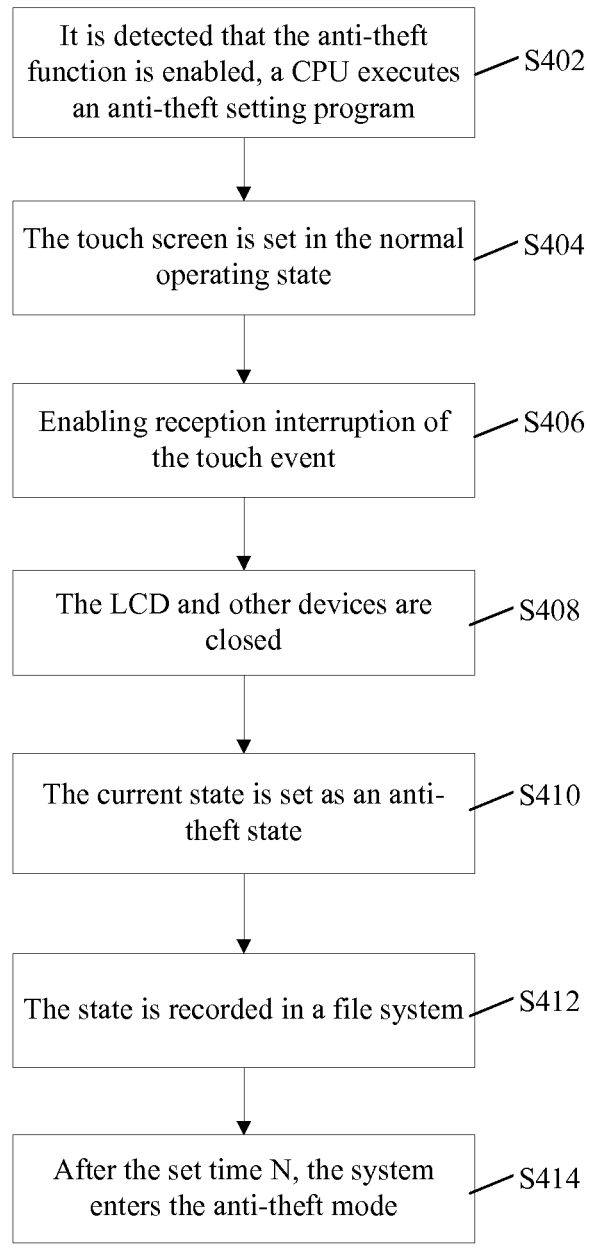
FIG. 4 is a flowchart of setting an anti-theft mode according to the example embodiment 2 of the disclosure.

FIG. 4 shows a flow of setting an anti-theft mode of the example embodiment; the flow includes S402 to S414.

S402: if it is detected that the anti-theft function is enabled, a CPU executes an anti-theft setting program.

A former setting value stored in a user interface is read first, a delay time parameter N of enabling anti-theft which is set by the user is read, and the whole system is enabled to enter the alarm mode. The time parameter N is a time interval from the time when the device enters the sleep mode to the time when the system enters the alarm mode; this time interval is provided for the user to place the terminal device, so as to avoid the false alarm. The time parameter N may be set according to the user demand, generally, it is less than 30 s. In the alarm mode, for saving power consumption, the terminal device needs to enter the sleep mode.

S404: the touch screen is set in the normal operating state.

S406: reception interruption of the touch event is enabled. The touch screen, serving as the anti-theft monitoring device, monitors occurrence of anti-theft event constantly. It can be seen from FIG. 2 that the touch screen informs the main controller of occurrence of stealing through the interruption control circuit, reception interruption of the touch event is enabled to detect the touch event. After the main controller entered the sleep mode, it may be woken through interruption and exits the sleep mode.

S408: the LCD and other devices are closed, so as to save power consumption.

S410: the current state is set as an anti-theft state. All the other functions, such as radio-frequency, Bluetooth and wifi, of the system except monitoring function are disabled.

S412: the state is recorded in a file system. No matter how the terminal device is rebooted or powered on, once it did not exit the anti-theft mode or the alarm state, the anti-theft setting program will read the state from the file system to make the system enter the anti-theft state.

S414: after the set time N, the system enters the anti-theft mode.

Example Embodiment 3

Figure 5:
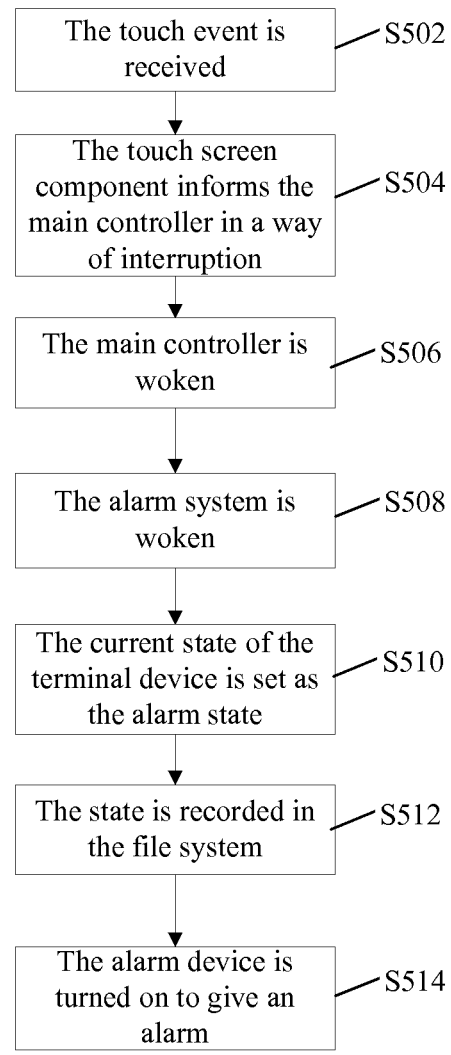
FIG. 5 is a flowchart of starting alarm implementation according to the example embodiment 3 of the disclosure.

FIG. 5 is a flowchart of starting alarm implementation; the embodiment is illustrated in combination with internal structure of the terminal; the flow includes S502 to S514.

S502: in the anti-theft mode, when there is stealing occurring, the touch event will be received.

S504: the touch screen component informs the main controller in a way of interruption.

S506: the main controller is woken.

S508: after being woken, the main controller exits the sleep state and enters the normal operating state to wake an alarm system. The alarm system is enabled to enter the normal operating state. The alarm system includes the display drive circuit, the audio drive circuit, the motor drive circuit and the radio-frequency circuit shown in FIG. 2.

S510: the current state of the terminal device is set as the alarm state.

S512: the state is recorded in the file system.

S514: the alarm device is turned on to give an alarm. The alarm mode includes at least one of the followings: vibration alarm, namely the motor starts vibrating; sound alarm, namely alarm sound is played through the speaker, the sound type and volume can be set by the user; making a call and/or sending a text message to a preset phone number; and activating the display screen to display the alarm interface.

Example Embodiment 4

Figure 6:
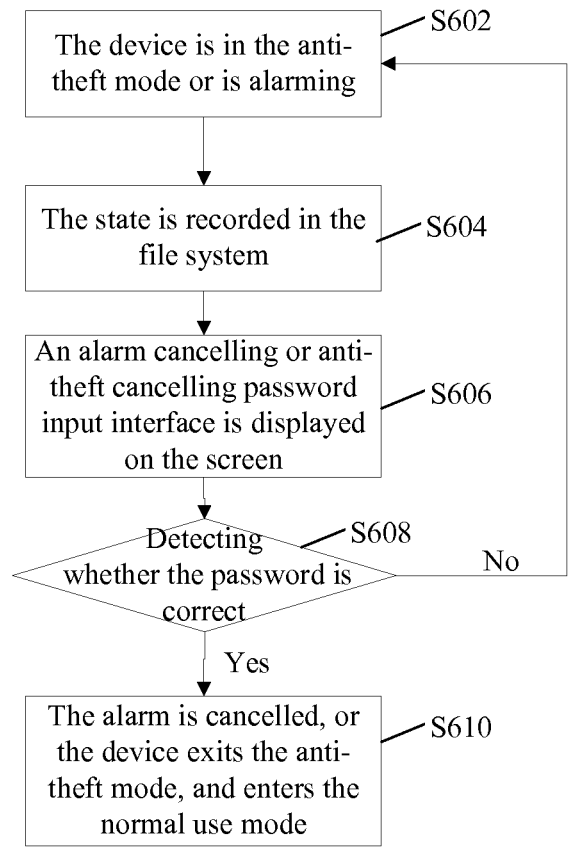
FIG. 6 is a flowchart of implementing alarm and alarm cancelling according to the example embodiment 4 of the disclosure.

FIG. 6 shows a flow of implementing alarm and alarm cancelling; the flow includes S602 to S610.

S602: the device is in the anti-theft mode or is alarming.

S604: the state is recorded in the file system. In an implementation process, the file system may be anything that can record the current state and play a memorizing function.

S606: an alarm cancelling or anti-theft cancelling password input interface is displayed on the screen.

S608: it is detected whether the password is correct; if the password is correct, S610 is executed; or else, S602 is executed.

S610: the alarm is cancelled, or the device exits the anti-theft mode, and enters the normal use mode.

The whole cancelling process provided by the embodiment of the disclosure is more user-friendly, correspondingly the function of recording state provides double-protection for the device; when the device has not received the password normally, it will not exit the mode, which enhances the stability of alarm function of the system.

Figure 7:
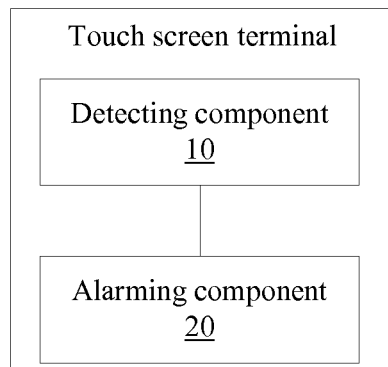
FIG. 7 is a structure diagram 1 of a touch screen terminal according to the embodiment of the disclosure.

The embodiment of the disclosure also provides a touch screen terminal; the structure diagram of an alarm part of the terminal is shown in FIG. 7, including: a detecting component 10, which is configured to detect whether the touch screen receives a touch event; and an alarming component 20, which is coupled with the detecting component 10 and configured to send an alarm in the case of detecting that the touch event has been received.

In the described embodiment, the detecting component may include: a starting unit, which is configured for the terminal to start the alarm mode; wherein the alarm mode alarms by executing the above alarm method; and a detecting unit, which is coupled with the starting unit and configured for the terminal to start to detect whether the touch screen receives a touch event after a pre-defined delay time.

Figure 8:
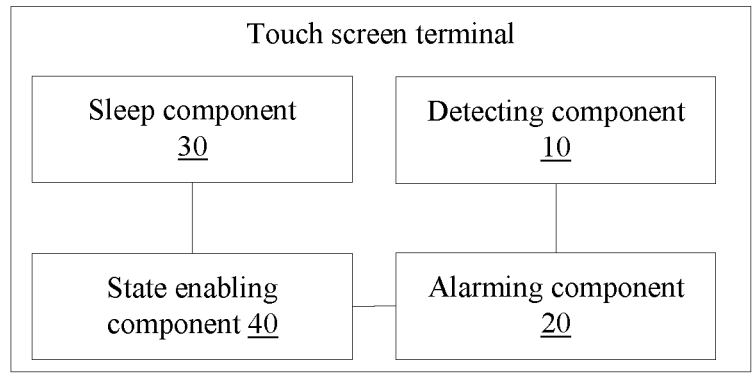
FIG. 8 is a structure diagram 2 of a touch screen terminal according to the embodiment of the disclosure.

In an implementation process, as shown in FIG. 8, the terminal may further include: a sleep component 30, which is configured to make the terminal enter a sleep mode; and a state enabling component 40, which is coupled with the sleep component 30 and the detecting component 10, and configured to make, in the sleep mode, the touch screen in a state of being able to receive the touch event.

Figure 9:
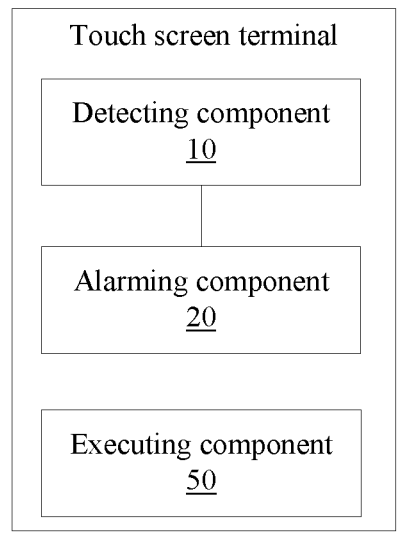
FIG. 9 is a structure diagram 3 of a touch screen terminal according to the embodiment of the disclosure.

In an example embodiment, as shown in FIG. 9, the terminal may further include: an executing component 50, which is configured to, after the terminal starts an alarm mode, in the case that the terminal has not received an alarm cancelling password or a received alarm cancelling password is wrong, still start the alarm mode when powering on the terminal again; wherein the alarm is given in the alarm mode by executing the alarm method. The component may be coupled with the alarming component 20; for recording after alarm, it may also be coupled with the detecting component 10, and starts recording the state when entering the alarm mode.

The above terminal may also include: a component which is configured to determine whether the received alarm cancelling password matches with the alarm cancelling password preset in the terminal; and a component which is configured to stop alarming in the case of matching.

The above terminal in the embodiment of the disclosure is illustrated in combination with the example embodiment.

Example Embodiment 5

The example embodiment provides a touch screen terminal; this terminal may adopt the above alarm method. The terminal device is equipped with the touch screen, the display screen, the main controller, audio output alarm device, or vibration alarm device and other alarm devices. The terminal implements anti-theft alarm without adding any hardware circuit and device; it makes use of existing hardware resources and uses the touch screen as the anti-theft monitoring device.

When the user enables the anti-theft function, the device enters the anti-theft mode. The touch screen is used as the anti-theft monitoring device, when someone is stealing the device, the touch screen is touched, and then the touch event is detected by the touch screen. The touch screen reports the touch event to the main controller. After receiving a message reported by the touch screen, the main controller makes the terminal device immediately enter an emergency alarm state.

The emergency alarm state includes at least one of the followings: the alarm device is turned on; the alarm interface is displayed on the display screen, waiting to input the alarm cancelling password.

Turning on the alarm device includes sound alarm and vibration alarm; the speaker of the terminal device acts as the sound alarm device; and the motor of the terminal device acts as the vibration alarm device. The user is warned through the alarm device that the terminal device is being stolen.

If the alarm is not cancelled, once the device is powered on, it enters the emergency alarm state.

The example embodiment does not need to add any hardware circuit and device, makes use of existing hardware resources of the terminal device, uses the touch screen as the anti-theft monitoring device, and uses the speaker and the vibration motor as the alarm device, so it will not increase any cost; the hardware is kept, and only software is required to implement, so it is simple and easy to implement; the touch screen is used as the anti-theft monitoring device, when there is stealing occurring, no matter what gesture is used, the touch screen is touched, and the touch is monitored by the touch screen, so the anti-theft effect is reliable.

It can be seen from above description that solutions in the embodiment of the disclosure achieve the following technical effects:

the embodiment of the disclosure adopts the following method: whether to give an alarm is determined by detecting whether the touch screen receives a touch event; the touch screen is taken as a monitoring device to monitor the touch event in real time. The touch screen has a relatively large size and high sensitivity, so it is easier to monitor occurrence of anti-theft event by taking the touch screen as the monitoring device; the embodiment of the disclosure solves the problem that due to the poor applicability of an anti-theft alarm method, alarm fails to really work, eventually the terminal is stolen, and further provides a more reliable anti-theft method of high practicability, thereby enhancing system performance and improving user experience.

Obviously, the skilled personnel in the field should appreciate that the above-mentioned components and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device to be executed by the computing device; in addition, under some conditions, the presented or described steps can be executed in an order different from that described here; or they are made into integrated circuit components, respectively; or multiple components and steps of them are made into a single integrated circuit component to realize. In this way, the disclosure is not limited to any particular combination of hardware and software.

The above is only the example embodiment of the disclosure and not intended to limit the disclosure; for the skilled personnel in the field, the disclosure may have various modifications and changes. Any modifications, equivalent replacements, improvements and the like within the principle of the disclosure shall fall within the scope of the claims of the disclosure.

What is claimed is:

1. An alarm method of a touch screen terminal, comprising:
   detecting, by the terminal, whether a touch screen receives a touch event;
   if so, sending, by the terminal, an alarm;
   wherein the method further comprises: after the terminal starts an alarm mode, in the case that the terminal has not received an alarm cancelling password or a received alarm cancelling password is wrong, still starting the alarm mode when powering on the terminal again, wherein the alarm is given in the alarm mode by executing the alarm method.

2. The method according to claim 1, wherein before detecting, by the terminal, whether the touch screen receives a touch event, the method further comprises:
   entering, by the terminal, a sleep mode; and
   making, by the terminal in the sleep mode, the touch screen in a state of being able to receive the touch event.

3. The method according to claim 1, wherein detecting, by the terminal, whether the touch screen has received the touch event comprises:
   starting, by the terminal, the alarm mode; and
   after a pre-defined delay time, starting, by the terminal, to detect whether the touch screen receives a touch event.

4. The method according to claim 1, wherein after the terminal sends an alarm, the method further comprises:
   determining whether a received alarm cancelling password matches with an alarm cancelling password preset in the terminal;
   if so, stopping alarming.

5. The method according to claim 1, wherein the alarm is given in at least one of the following manners: sound alarm, vibration alarm, display alarm, and sending alarm, wherein the sending alarm means making a call and/or sending a text message to a preset phone number.

6. A touch screen terminal, comprising:
   a detecting component, which is configured to detect whether a touch screen receives a touch event; and an alarming component, which is configured to send an alarm in the case of detecting that the touch event has been received;

wherein the terminal further comprises: an executing component, which is configured to, after the terminal starts an alarm mode, in the case that the terminal has not received an alarm cancelling password or a received alarm cancelling password is wrong, still start the alarm mode when powering on the terminal again, wherein the alarm is given in the alarm mode by executing the alarm method.

7. The terminal according to claim 6, further comprising:
a sleep component, which is configured to make the terminal enter a sleep mode; and
a state enabling component, which is configured to make, in the sleep mode, the touch screen in a state of being able to receive the touch event.

8. The terminal according to claim 6, wherein the detecting component comprises:
a starting unit, which is configured for the terminal to start an alarm mode; and
a detecting unit, which is configured for the terminal to start to detect whether the touch screen receives a touch event after a pre-defined delay time.

9. The method according to claim 2, further comprising:
after the terminal starts an alarm mode, in the case that the terminal has not received an alarm cancelling password or a received alarm cancelling password is wrong, still starting the alarm mode when powering on the terminal again, wherein the alarm is given in the alarm mode by executing the alarm method.

10. The method according to claim 9, wherein detecting, by the terminal, whether the touch screen has received the touch event comprises:
starting, by the terminal, the alarm mode; and
after a pre-defined delay time, starting, by the terminal, to detect whether the touch screen receives a touch event.

11. The terminal according to claim 7, wherein the detecting component comprises:
a starting unit, which is configured for the terminal to start an alarm mode; and
a detecting unit, which is configured for the terminal to start to detect whether the touch screen receives a touch event after a pre-defined delay time.

12. The terminal according to claim 6, wherein the detecting component comprises:
a starting unit, which is configured for the terminal to start an alarm mode; and
a detecting unit, which is configured for the terminal to start to detect whether the touch screen receives a touch event after a pre-defined delay time.

* * * * *